J. P. QUILL.
PNEUMATIC TIRE SHIELD.
APPLICATION FILED JAN. 21, 1914.
1,109,784.
Patented Sept. 8, 1914.
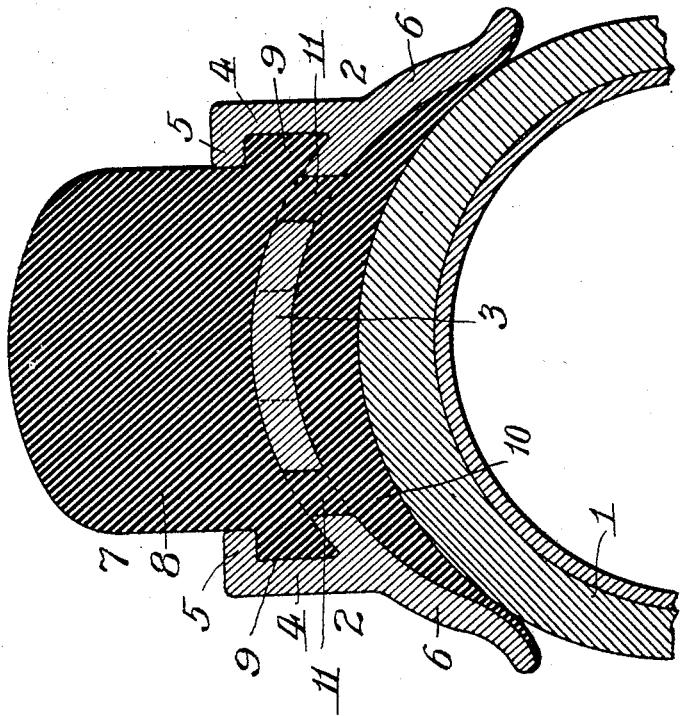
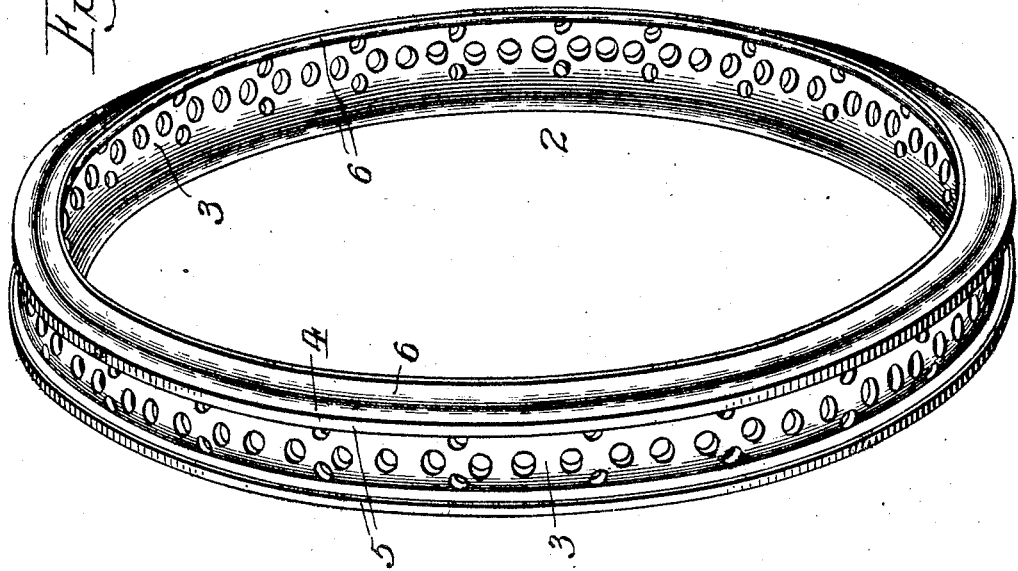
Witnesses:
John Enders
Henry Moz.
Inventor:
John P. Quill,
by Robert Burns
Atty.

UNITED STATES PATENT OFFICE.

JOHN P. QUILL, OF CHICAGO, ILLINOIS.

PNEUMATIC-TIRE SHIELD.

1,109,784.  Specification of Letters Patent.  Patented Sept. 8, 1914.

Application filed January 21, 1914. Serial No. 813,364.

*To all whom it may concern:*

Be it known that I, JOHN P. QUILL, a citizen of the United States of America, and a resident of Chicago, in the county of Cook, State of Illinois, have invented certain new and useful Improvements in Pneumatic-Tire Shields, of which the following is a specification.

This invention relates to that class of pneumatic tire shields, in which an annular cushion tire or tread is applied to the periphery of a pneumatic tire. And the present improvement has for its object to provide a simple and efficient structural formation and arrangement of the tire shield parts adapted to effectively support the cushion portion of the shield in proper position during the stress of actual use, and in addition thereto provide the proper adhesion between the tire shield and the pneumatic tire and thus maintain the parts in proper relation during the stress of actual use, all as will hereinafter more fully appear.

In the accompanying drawing: Figure 1, is a detail transverse section of the rim portion of a vehicle wheel, illustrating the present invention in its application to the pneumatic cushion of said wheel. Fig. 2, is a detail perspective view of the skeleton reinforcing ring of the present tire shield.

Similar reference numerals indicate like parts in both views.

Referring to the drawings, 1 represents a portion of an ordinary pneumatic tire, upon the periphery of which is mounted the present tire shield.

2 is the skeleton reinforcing ring of the tire shield, and which ring in the present improvement is formed with a central orificed web 3, and outwardly extending annular flanges 4, at the respective sides of the aforesaid central web 3, the outer portions of said flanges 4 being inturned to form overhanging lips 5 and provide annular holding cavities for the cushion tire or tread hereinafter described. Said reinforcing ring is also formed with inwardly disposed annular side flanges 6 of a curved form in cross-section, as shown, and which constitute holding skirts adapted to maintain the tire shield in proper place in the present improvement.

7 is the annular cushion tire or tread of the present tire shield, and which tread comprises a main central tread portion 8, having side flanges 9 adapted for holding engagement in the holding cavities formed in the skeleton reinforcing ring 2, by the overhanging lips 5, as shown and as heretofore described. Said tire or tread 7 also comprises an inner annular portion 10, which forms a lining for the inner surface of the central web 3, and for the inner surfaces of the holding skirts or flanges 6, of the reinforcing ring 2. Said inner annular portion 10 is integrally connected with the main central tread portion 8 by parts 11 of the material of the tread or tire 7, and filling the orifices in the central web 3 of the reinforcing ring 2, above described.

The aforesaid inner annular portion or lining 10, is preferably formed of some thickness at its mid-width, and tapering therefrom to a thin edge at its sides, and so that the metal of the outer portions of the holding skirts or flanges 6 of the reinforcing ring 2, will have close relation to the periphery of the pneumatic tire 1, and assist in preventing any independent lateral movement or slip of the tire shield in relation to the pneumatic tire.

In the preferred construction of the present invention the cushion tire or tread 7 and its parts, will be molded to the reinforcing ring 2, in a suitable mold and by means of the ordinary vulcanizing process, to attain the desired adhesion between the parts.

With the present improvement, the tire shield comprising the annular tire or tread 7 and reinforcing ring 2 are applied to the pneumatic tire 1, while the same is in a deflated condition. After the tire shield is so applied, the pneumatic tire is properly inflated, and when so inflated will very effectively hold the tire shield against any independent movement or slip, and without any other holding means than the enforced adhesion between the lining 10 and the periphery of the pneumatic tire or cushion 1.

Having thus fully described my said invention what I claim as new and desire to secure by Letters Patent, is:—

1. A tire shield comprising, a reinforcing ring formed with a central orificed web, outwardly extending annular flanges having inwardly overhanging annular lips, and inwardly disposed side flanges or skirts of a curved form in cross-section, and an annular cushion tire or tread comprising a central tread portion, side flanges on said tread portion adapted for engagement beneath the aforesaid overhanging lips, and with an inner annular portion or lining integrally connected to the main tread portion through the orifices in the central orificed web of the reinforcing ring aforesaid, substantially as set forth.

2. A tire shield comprising, a reinforcing ring formed with a central orificed web, outwardly extending annular flanges having inwardly overhanging annular lips, and inwardly disposed side flanges or skirts of a curved form in cross-section, and an annular cushion tire or tread comprising a central tread portion, side flanges on said tread portion adapted for engagement beneath the aforesaid overhanging lips, and with an inner annular portion or lining integrally connected to the main tread portion through the orifices in the central orificed web of the reinforcing ring aforesaid, the said lining being of added thickness at its mid-width and tapering therefrom to a thin edge at its respective sides, substantially as set forth.

Signed at Chicago, Illinois, this 17th day of January, 1914.

JOHN P. QUILL.

Witnesses:
ROBERT BURNS,
JOHN ENDERS.